US010076098B2

(12) United States Patent
Matsuo et al.

(10) Patent No.: US 10,076,098 B2
(45) Date of Patent: Sep. 18, 2018

(54) ANIMAL LITTER BOX

(75) Inventors: Takayuki Matsuo, Kagawa (JP); Tatsuya Sogou, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 145 days.

(21) Appl. No.: 14/232,235

(22) PCT Filed: May 17, 2012

(86) PCT No.: PCT/JP2012/062598
§ 371 (c)(1),
(2), (4) Date: Jan. 10, 2014

(87) PCT Pub. No.: WO2013/008532
PCT Pub. Date: Jan. 17, 2013

(65) Prior Publication Data
US 2014/0150727 A1 Jun. 5, 2014

(30) Foreign Application Priority Data

Jul. 13, 2011 (JP) .................. 2011-155206

(51) Int. Cl.
*A01K 1/01* (2006.01)
(52) U.S. Cl.
CPC .......... *A01K 1/0107* (2013.01); *A01K 1/0114* (2013.01)
(58) Field of Classification Search
CPC .... A01K 1/0107; A01K 1/114; A01K 1/0125; Y10T 16/462; Y10T 16/4628;
(Continued)

(56) References Cited

U.S. PATENT DOCUMENTS 1,784,518 A * 12/1930 Gillooly .................. B25H 3/02
217/57
2,438,871 A * 3/1948 Bullock .................. A47B 95/02
16/416
(Continued)

FOREIGN PATENT DOCUMENTS

DE    2348315 A1 * 4/1975 ............. A47B 95/02
DE    3505212 A1 * 11/1985 ............. A47B 95/02
(Continued)

OTHER PUBLICATIONS

<http://www.tidycats.com/Products/Breeze>; Breeze (R) from Purina (R) Tidy Cats (R); Purina (R); Jan. 10, 2010. See attached screenshot from Jan. 10, 2010.*
(Continued)

*Primary Examiner* — Joshua Daniel Huson
*Assistant Examiner* — Morgan T Barlow
(74) *Attorney, Agent, or Firm* — Hauptman Ham, LLP

(57) ABSTRACT

An animal litter box has a transverse direction, a longitudinal direction and a vertical direction and includes a lower container having an opening at an upper end thereof and allocated on the lower side, an upper side cover allocated above the lower container and a liquid passable litter tray interposed between the upper side cover and the lower container and cooperating with the lower container to close the opening. The lower container has an excrement tray provided so as to be manually movable in the longitudinal direction between a put-in position at which the excrement tray is set within the receiving space below the liquid passable litter tray and a drawn out position outside the receiving space and an end opening through which the excrement tray is put into or drawn out from the receiving space.

16 Claims, 16 Drawing Sheets

(58) Field of Classification Search
CPC ........ A47B 2095/024; A47B 2095/026; A47B 2095/027; A47B 95/02; E05B 1/003; E05B 2001/0023; B65D 25/2802; B65D 25/28
USPC ................ 119/165, 166, 168, 169; D3/282; 312/332.1, 244, 348.6; 220/768, 769, 220/771; D30/109; 16/421, 415, 416
See application file for complete search history.

(56) References Cited

U.S. PATENT DOCUMENTS

| | | | | |
|---|---|---|---|---|
| 2,653,851 | A * | 9/1953 | Davidson | A47B 95/02 16/412 |
| D175,656 | S * | 9/1955 | Trout et al. | 312/348.6 |
| 3,206,270 | A * | 9/1965 | Vincens | A47B 95/02 312/348.6 |
| 3,294,463 | A * | 12/1966 | Kafferlin | A47B 95/02 16/416 |
| 3,549,228 | A * | 12/1970 | Aleks | A47B 95/02 312/330.1 |
| 4,040,695 | A * | 8/1977 | Brann | A47B 95/02 16/416 |
| 4,153,314 | A * | 5/1979 | Prater | A45C 13/26 16/110.1 |
| 4,217,857 | A * | 8/1980 | Geddie | A01K 1/0114 119/166 |
| 4,401,350 | A * | 8/1983 | Fortune | A47B 87/02 292/128 |
| 4,469,046 | A * | 9/1984 | Yananton | 119/169 |
| 4,716,853 | A * | 1/1988 | d'Aniello | A01K 5/0114 119/165 |
| 5,136,146 | A * | 8/1992 | Anglin | G06F 15/0216 235/441 |
| 5,167,204 | A * | 12/1992 | Nussle | A01K 1/0114 119/166 |
| 5,383,554 | A * | 1/1995 | Cowan | G11B 33/0427 206/310 |
| 5,403,139 | A * | 4/1995 | Slivon | E05B 65/46 312/319.1 |
| 5,730,511 | A * | 3/1998 | Doan | A47B 95/02 312/234.4 |
| 5,755,182 | A * | 5/1998 | Brown, Jr. | A01K 1/0114 119/165 |
| 5,791,289 | A * | 8/1998 | Savicki | A01K 1/0107 119/165 |
| 6,129,050 | A * | 10/2000 | Carbajal | A01K 1/0107 119/165 |
| 6,193,062 | B1 * | 2/2001 | Rysgaard | A01K 97/06 206/315.11 |
| 6,193,340 | B1 * | 2/2001 | Schenker | A47B 47/0075 312/108 |
| 6,408,790 | B1 * | 6/2002 | Maguire | A01K 1/0114 119/165 |
| 7,017,519 | B1 * | 3/2006 | Deasy | A01K 1/0114 119/166 |
| D536,841 | S * | 2/2007 | Hirokawa | D30/161 |
| 7,185,783 | B1 * | 3/2007 | Miller | B65F 1/14 206/515 |
| 7,540,574 | B2 * | 6/2009 | Wu | G06F 1/187 312/223.2 |
| 8,011,531 | B2 * | 9/2011 | Vovan | B65D 21/0228 220/4.21 |
| 2003/0189340 | A1 * | 10/2003 | Kitzis | B65F 1/1615 292/145 |
| 2003/0217700 | A1 * | 11/2003 | Northrop | A01K 1/0114 119/166 |
| 2004/0261727 | A1 * | 12/2004 | Matsuo et al. | 119/170 |
| 2004/0263032 | A1 * | 12/2004 | Cho | A47B 67/04 312/330.1 |
| 2005/0045649 | A1 * | 3/2005 | Sander | D06F 95/002 220/771 |
| 2005/0115510 | A1 * | 6/2005 | D'Anielo | A01K 1/0114 119/166 |
| 2005/0126504 | A1 * | 6/2005 | Strickland | A01K 1/0114 119/166 |
| 2005/0211182 | A1 * | 9/2005 | Sage, Jr. | A01K 1/0107 119/621 |
| 2006/0027560 | A1 * | 2/2006 | Song | F24C 15/325 219/400 |
| 2006/0037549 | A1 * | 2/2006 | Kim | 119/166 |
| 2006/0042551 | A1 * | 3/2006 | Moran | 119/166 |
| 2006/0191447 | A1 * | 8/2006 | Ashby | A47B 3/02 108/119 |
| 2007/0163508 | A1 * | 7/2007 | Gloor | 119/166 |
| 2008/0314328 | A1 * | 12/2008 | Johnson | 119/166 |
| 2009/0000556 | A1 * | 1/2009 | Matsuo et al. | 119/161 |
| 2009/0000558 | A1 * | 1/2009 | Matsuo et al. | 119/165 |
| 2009/0000559 | A1 * | 1/2009 | Matsuo et al. | 119/166 |
| 2009/0000560 | A1 * | 1/2009 | Matsuo et al. | 119/168 |
| 2009/0277913 | A1 * | 11/2009 | Bergman | B44D 3/126 220/570 |
| 2010/0043717 | A1 * | 2/2010 | Walker | 119/167 |
| 2011/0169389 | A1 * | 7/2011 | Jeffries | A47B 95/02 312/333 |
| 2013/0333625 | A1 * | 12/2013 | Baxter | A01K 1/011 119/166 |
| 2017/0367294 | A1 * | 12/2017 | Takagi | A01K 1/0107 |

FOREIGN PATENT DOCUMENTS

| | | | | |
|---|---|---|---|---|
| EP | 0981981 | A1 * | 3/2000 | ............ A47B 95/02 |
| EP | 1488690 | A2 | 12/2004 | |
| EP | 2363041 | A1 * | 9/2011 | ............ A47B 67/04 |
| GB | 1034150 | A * | 6/1966 | ............ A47B 95/02 |
| GB | 1494238 | A * | 12/1977 | ............ A47B 95/02 |
| GB | 2141617 | A * | 1/1985 | ............ A47G 19/12 |
| JP | 2-46693 | Y2 | 12/1990 | |
| JP | 10323246 | A * | 12/1998 | |
| JP | 2009-011181 | A | 1/2009 | |
| JP | 2011-004664 | A | 1/2011 | |
| WO | 2011/080853 | A1 | 7/2011 | |

OTHER PUBLICATIONS

International Search Report dated Aug. 21, 2012 in International Application No. PCT/JP2012/062598, filed May 17, 2012.
Extended European Search Report dated Mar. 2, 2015, corresponding to European patent application No. 12812055.7.

* cited by examiner

FIG.15
(a)
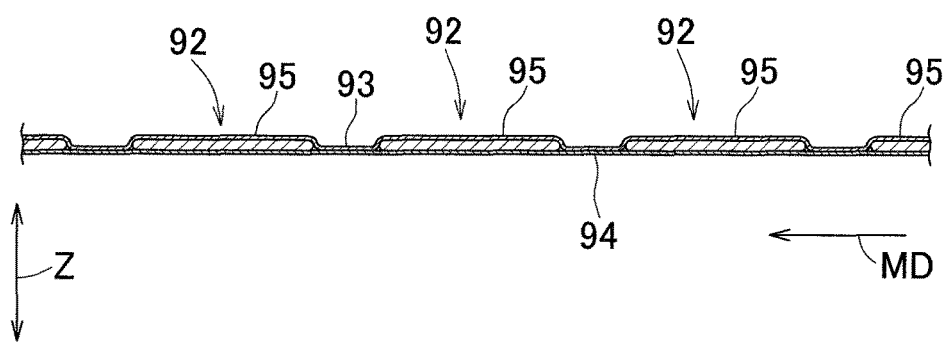
(b)
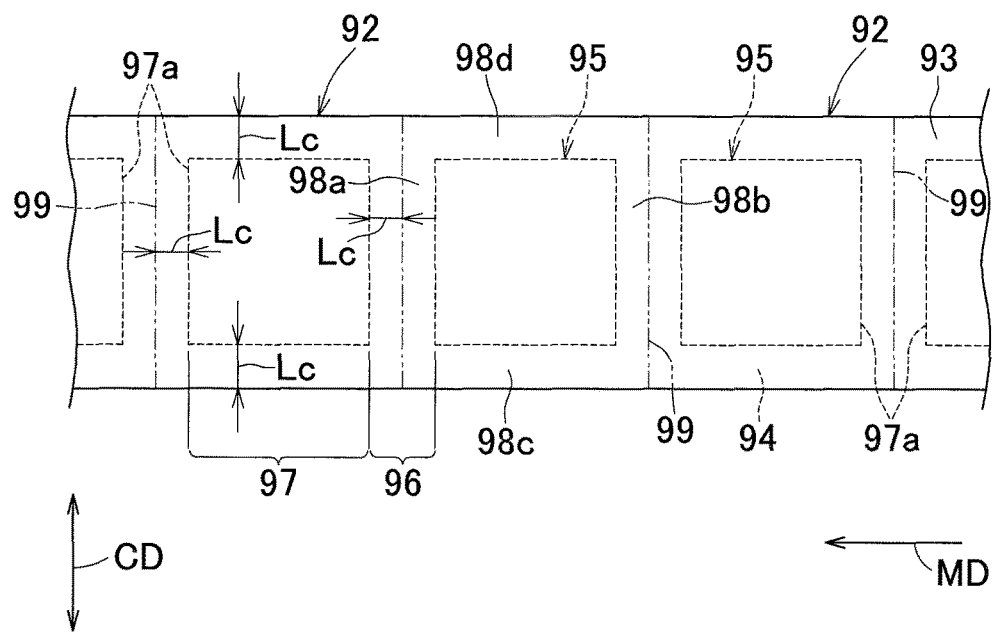

ANIMAL LITTER BOX

RELATED APPLICATIONS

The present application is a National Phase of International Application No. PCT/JP2012/062598, filed May 17, 2012, and claims priority from Japanese Patent Application No. 2011-155206, filed, Jul. 13, 2011.

TECHNICAL FIELD

The present invention relates to animal litter boxes such as cats.

BACKGROUND

Litter boxes used for animals such as cats are known.

For example, the patent literature 1 discloses an animal litter box having a longitudinal direction, a transverse direction and a vertical direction and including three parts, i.e., a lower container placed on the lower side, an upper side cover put on an upper end of the lower container and a cover put on the upper side cover.

The upper side cover includes a bottom wall through which liquid passes and which extends on the lower side thereof and cooperates with the lower container to define a receiving space in such a manner that liquid inflows into this space.

The lower container includes an excrement tray adapted to be movable in the longitudinal direction between a put-in position within the receiving space below the bottom wall of the upper side cover and a position outside the receiving space. This tray has a rectangular bottom wall in its planar view and side wall rising from a peripheral edge defined by four sides of the bottom wall.

CITATION LIST

Patent Literature

{PTL 1}: JP 2009-11181A

SUMMARY

Technical Problem

Referring to FIG. 14, generally in the animal litter boxes having the upper side cover 80 put on the lower container 81, a clearance 91 is intentionally left in the vertical direction Z between the upper end 90c of the side wall 90a of the tray 90 and the lower end 82a of the bottom wall 82 of the upper side cover 80 so that the tray 90 can be smoothly moved in the longitudinal direction back and forth from and into the lower container 81.

A fall length (La) of animal liquid excrement, for example, urine of animals is equal to a length calculated by subtracting a thickness (Hc) of the absorbent structure 92 in the vertical direction Z from a sum of an interior height (Ha) of tray 90 in vertical direction Z and a height (Hb) of the clearance 91 in the vertical direction Z.

When the animal liquid excrement falling from the lower end 82a of the bottom wall 82 impinges on the absorbent structure 92, droplets spatter. Conventionally, there has been a problem that these droplets may adhere to the interior wall surface of the lower container 81 and move along the interior wall surface until these droplets may leak out from the tray 90 and/or there has been a problem that the droplets may move to a backside of the absorbent structure 92 put on the tray 90 and cause an offensive odor.

To overcome these problems, an amount of the animal liquid excrement droplets may be reduced. Preferably, for the purpose of reducing the amount of the droplets, the fall length (La) may be shortened and whereby a potential energy may be reduced.

The absorbent structure 92 used for the litter box includes a liquid-permeable topsheet 93, a liquid-impermeable backsheet 94 and an absorbent core 95 interposed between these sheets 93, 94. The absorbent core 95 is formed of, for example, a mixture of wood fluff pulp and superabsorbent polymer particles so as to be formed of a rectangle as seen in its planar view referring to FIG. 15(b).

The individual absorbent structure 92 are formed, in a process of manufacturing the absorbent structure 92 as schematically illustrated in FIG. 15(b), by placing the absorbent cores 95 on the upper surface of the backsheet 94 which is being conveyed in a machine direction MD, then bonding the topsheet 93 to the upper surface of the backsheet 94 so as to cover the absorbent cores 95 and cutting such assembled web sequentially in the machine direction MD in non-existent regions 96 in which the absorbent cores 95 are non-existent.

Cutting preferably occurs in an intermediate position 99 (indicated by a chain double-dashed line in FIG. 15(b)) defined between adjacent ends 97a of the cores 95 which are adjacent to each other in the machine direction MD. However, in consideration that there is a possibility that the position of cutting might be unintentionally shifted in the machine direction MD, a front flap 98a and a rear flap 98b in which the absorbent core 95 is not present are formed, respectively along both edges of the individual absorbent structure 92 in the machine direction MD. A length dimension Lc of these front and rear flaps 98a, 98b in the machine direction MD, respectively, is 15 mm sufficiently to prevent the wood fluff pulp and/or the superabsorbent polymer particles from dropping out of the absorbent core.

For a similar reason, along both edges of the individual absorbent structure 92 in a cross direction CD being orthogonal to the machine direction MD, a left flap 98c and a right flap 98d in which the absorbent core 95 is not present are formed to prevent the wood fluff pulp and/or the superabsorbent polymer particles from dropping out of the absorbent core. A length dimension Lc of these left and right flaps 98c, 98d in the cross direction CD, respectively, is 15 mm for the similar reason.

In such litter box, when the tray 90 is moved back into the receiving space 83 after the tray 90 has been moved outward from the receiving space 83 of the lower container 80 and the soiled absorbent structure 92 has been exchanged with the fresh absorbent structure 92, there is a possibility that the flaps 98a-98d might come in contact with the bottom wall 82 of the side cover 80 and be curled up. To avoid such situation, a length Lb of the side wall 90a illustrated in FIG. 14 is to be larger than the length Lc of the respective flaps 98a-98d.

Due to the presence of such flaps 98a-98d, there is a problem that it is difficult to shorten the length dimension of the side wall 90a in the vertical direction Z and to shorten the fall length (La) of animal liquid excrement.

In view of this, an object of the present invention is to provide a litter box for animals having a shortened fall length of animal liquid excrement.

In this regard, the patent literature 1 discloses, referring to FIG. 16 relating to prior art, an arrangement such that a pair of the side walls 90a opposed to each other in the transverse direction X are slightly tilted with respect to the horizontal plane 84 so that the tray 90 may be smoothly demolded in the course of molding the tray with use of thermoplastic synthetic resin. In general, such a tilt angle θ3 of the side walls with respect to the horizontal plane 84 created in consideration of smooth demolding of the tray 90 is in a range of about 88.5 to about 89.0 degrees. However, the arrangement of such side walls 90a is not based on an intendment of shortening the fall length of animal liquid excrement as much as possible. This is apparent from an arrangement such that another pair of the side walls 90a2 opposed to each other in a longitudinal direction extends in a direction perpendicular to the horizontal plane and, in addition, unevennesses 85 are created between the upper ends 90c of the pair of the side walls 90a opposed to each other in the longitudinal direction and upper ends 90e of the pair of the side walls 90a1 opposed to each other in the transverse direction X.

Solution to Problem

The present invention provides an animal litter box having a transverse direction, a longitudinal direction and a vertical direction and including a lower container having an upper opening, an upper side cover allocated on the lower container and a liquid passable litter tray interposed between the upper side cover and the lower container and cooperating with the lower container to close the opening, thereby defining a receiving space in such a manner that the liquid inflows into the receiving space. The lower container has an excrement tray provided so as to be manually movable in the longitudinal direction between a put-in position at which the excrement tray is set within the receiving space below the liquid passable litter tray and a drawn out position outside the receiving space and an end opening through which the excrement tray is put into or drawn out from the receiving space. The excrement tray has a bottom wall shaped in a rectangle as seen in its planar view and side walls formed along a peripheral edge composed of four sides of the bottom wall and adapted to be put in contact with flap extending along a peripheral edge of the absorbent structure. A pair of the side walls is formed in a tilted manner so as to be gradually distanced from each other as the side walls extend upward.

According to a preferred embodiment of the present invention, under the assumption that θ represents a tilt angle of an imaginary line passing through an end of the bottom wall and an upper end of the side wall relative to a horizontal plane in a range of 20° to 80°, the side wall is formed so as to extend within an imaginary region defined by a first imaginary straight line extending at an angle of 80° relative to the horizontal plane and a second imaginary straight line extending at an angle of 20° relative to the horizontal plane.

According to another preferred embodiment of the present invention, the liquid passable litter tray has a plurality of through-holes assuring fluid communication between the receiving space and the upper space, a liquid passable region which is rectangular as seen in its planar view and a non-liquid passable region extending along a peripheral edge of the liquid passable region and formed with none of the through-holes and a total area of the bottom wall and the side walls is larger than an area of the liquid passable region and, with the excrement tray set at the put-in position, the liquid passable region is included with a region immediately above the bottom wall and the side wall.

According to still another preferred embodiment of the present invention, an area of the bottom wall of the excrement tray is larger than an area of the liquid passable region and, with the excrement tray set at the put-in position, the liquid passable region is included with a region above the bottom wall.

According to yet another preferred embodiment of the present invention, the area of the liquid passable region is larger than the area of the bottom wall of the excrement tray and, with the excrement tray set at the put-in position, the bottom wall is included within a region below the liquid passable region.

According to further another preferred embodiment of the present invention, the excrement tray is formed with a user's finger insertion groove into which the user's fingers are inserted for the purpose of moving the excrement tray into the put-in position within the receiving space or to the drawn out position so that the user's finger insertion groove may lie adjacent to the side wall and the user's finger insertion groove includes a horizontal portion extending in a horizontal direction from the upper end of the side wall and a protrusion portion protrusion downward from an end of the horizontal portion so as to face the side wall wherein the length dimension in the vertical direction of the protrusion portion is smaller than the length dimension in the vertical direction of the side wall and having a concave portion between the side wall and the protrusion portion.

According to another preferred embodiment of the present invention, the excrement tray is formed so that an outer peripheral surface of the protrusion portion may extend along an outer peripheral surface of the lower container.

According to still another preferred embodiment of the present invention, a length dimension of the side wall measured along a tilted surface thereof is in a range of 15 mm to 50 mm.

According to yet another preferred embodiment of the present invention, an apparent length dimension in the vertical direction of the side wall is in a range of 5.1 mm to 49.3 mm.

Advantageous Effects of Invention

In the animal litter box according to the present invention, the pair of the side walls is arranged in a tilted manner so that these side walls are gradually distanced from each other as these side walls extend upward. With such arrangement, the apparent length dimension measured in the vertical direction may be reduced, maintaining the length of the side walls as well as the length of the flaps of the absorbent structure. Whereby it is possible to provide the animal litter box improved to reduce the fall length of the animal liquid excrement as much as possible. In addition, since the pair of the side walls is arranged so as to be gradually distanced from each other as these side walls extend upward, the area of the opening defined by the upper ends of the side walls may be enlarged, thereby preventing the liquid excrement from leaking out of the excrement tray.

BRIEF DESCRIPTION OF DRAWINGS

FIG. 15(*a*) is a sectional view of the absorbent structure and FIG. 15(*b*) is a plan view partially illustrating a manufacturing process for the absorbent structure.

DESCRIPTION OF EMBODIMENTS

Embodiments of an animal litter box according to the present invention will be described in details with reference to the accompanying drawings.

Figure 1:
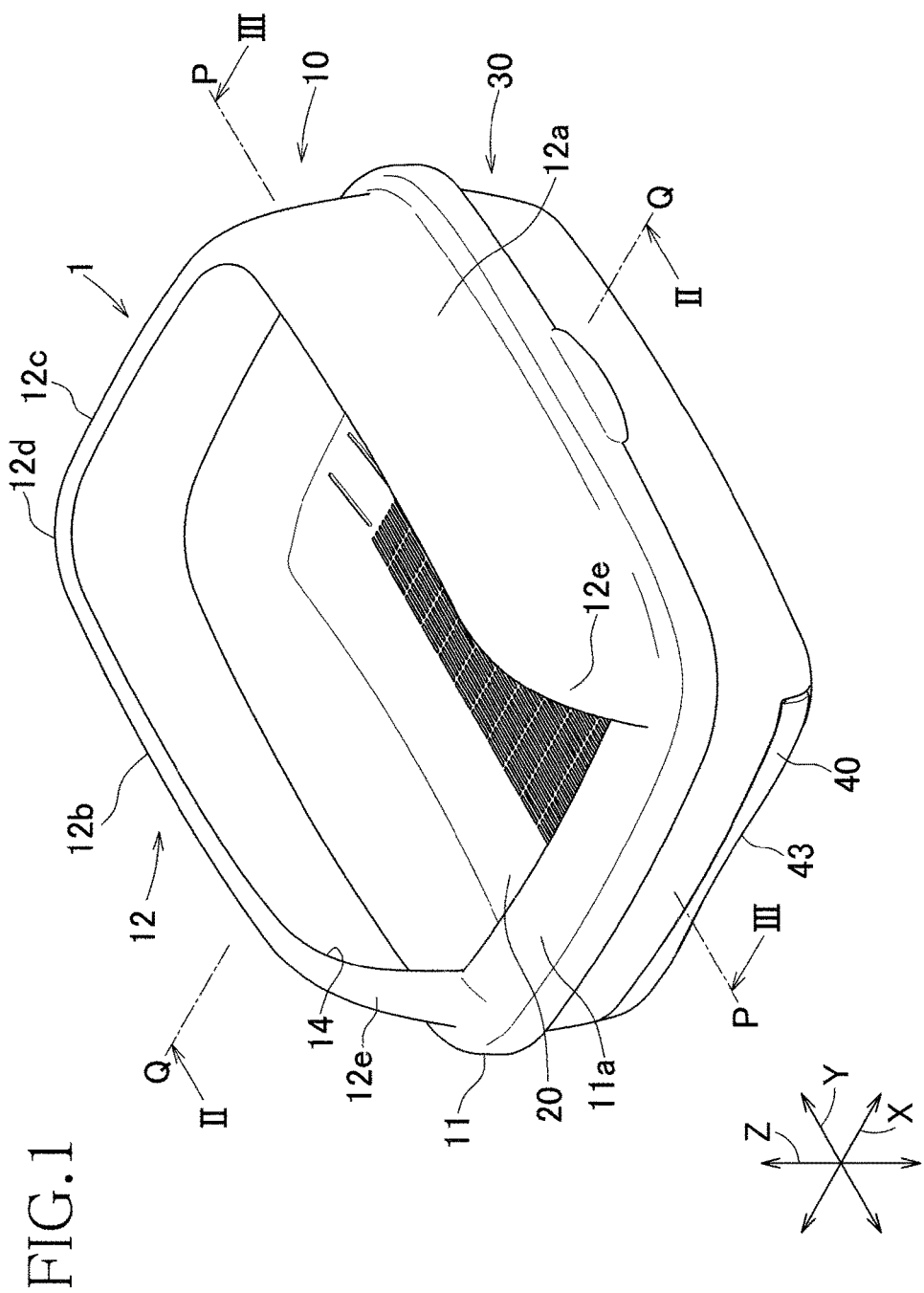
FIG. 1 is a perspective view of an embodiment of the animal litter box according to the present invention.

FIG. 1 is an overall perspective view of the animal litter box. In FIG. 1, X indicates a transverse direction, Y indicates a longitudinal direction being orthogonal to the transverse direction X and Z indicates a vertical direction being orthogonal to the transverse direction X and the longitudinal direction Y, respectively. P indicates an imaginary longitudinal center line bisecting a length dimension of the litter box 1 in the transverse direction X and Q indicates an imaginary transverse center line bisecting a length of the litter box 1 in the longitudinal direction Y.

The litter box 1 includes a lower container 30 provided on its top side with a top opening 31 as described later, an upper side cover 10 put on an upper side of the lower container 30 and a liquid passable litter tray 20 interposed between the upper side cover 10 and the lower container 30 so as to cooperate with the lower container 30 to close the opening 31 and to define a receiving space 2 as described later in such a manner that liquid inflows into the receiving space 2.

The upper side cover 10 includes a frame 11 and a wall 12 extending upward from an upper end of the frame 11 configured to open on the front side and upside. The frame 11 and the wall 12 are integrally molded with use of polyolefin-based thermoplastic synthetic resins such as polyethylene, polypropylene or polyethylene-terephthalate.

The wall 12 is composed of both side walls 12*a*, 12*b* facing each other in the transverse direction X and a rear end wall 12*c* connecting respective rear ends in the longitudinal direction Y of the both side walls 12*a*, 12*b*. None of the wall is formed between front ends 12*e* of the both side walls 12*a*, 12*b*. Respective upper ends 12*d* of the walls 12*a*, 12*b* and 12*c*, front ends 12*e* of the walls 12*a*, 12*b* and an upper end 11*a* of the frame 11 on its front side cooperate together to define a doorway 14.

Figure 2:
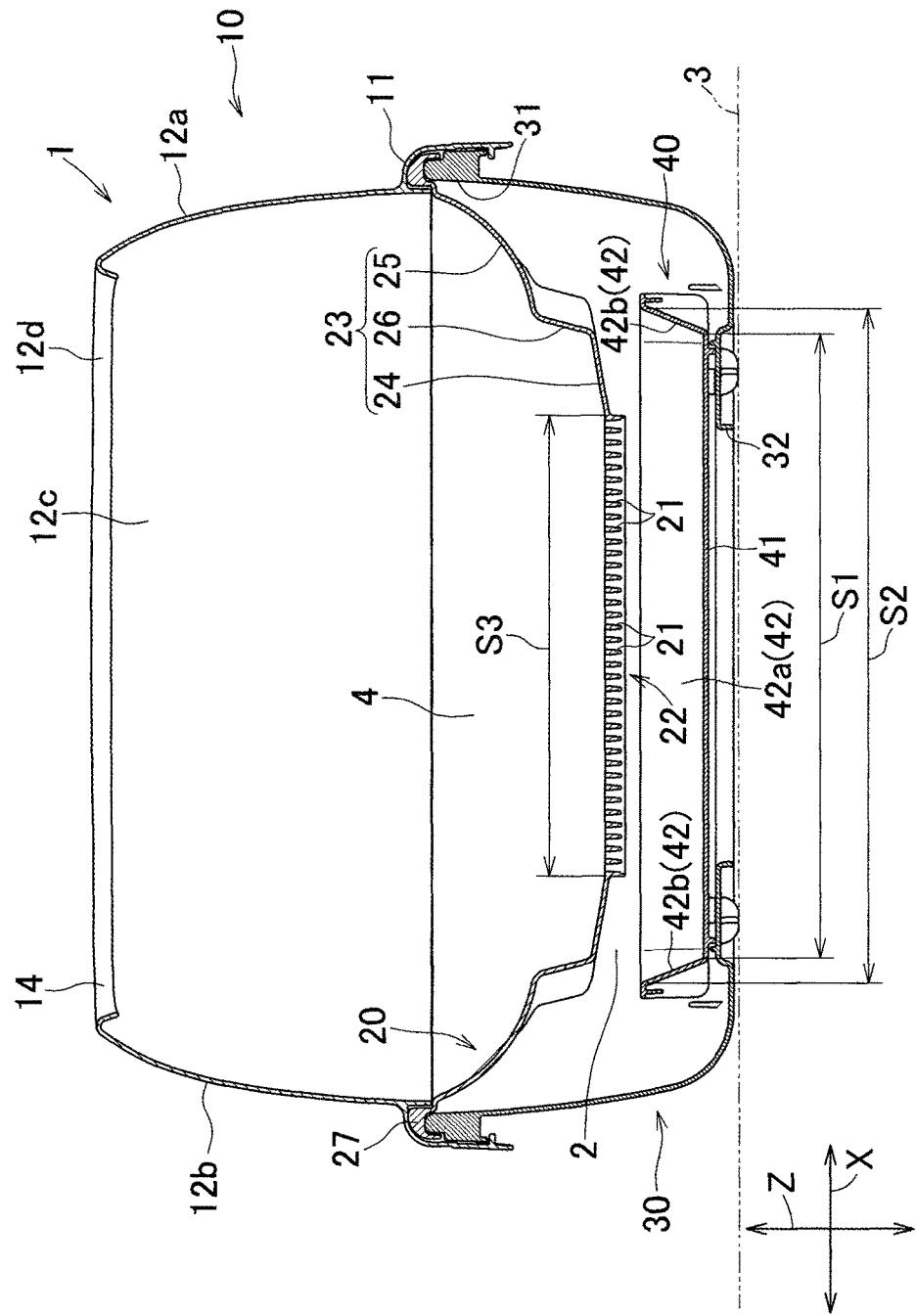
FIG. 2 is a sectional view taken along line II-II corresponding to an imaginary transverse center line Q in FIG. 1.
Figure 3:
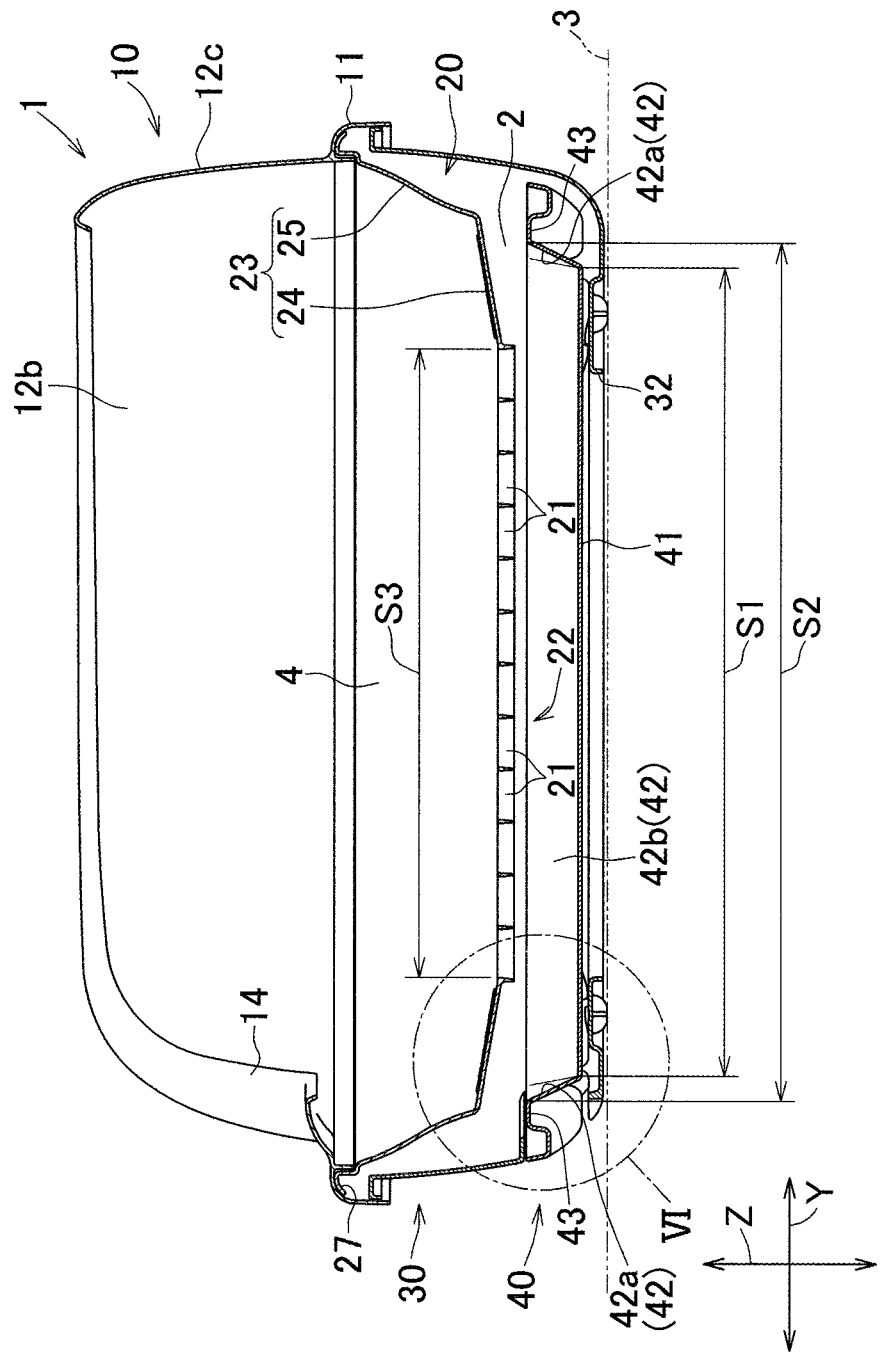
FIG. 3 is a sectional view taken along line corresponding to an imaginary longitudinal center line P in FIG. 1.
Figure 4:
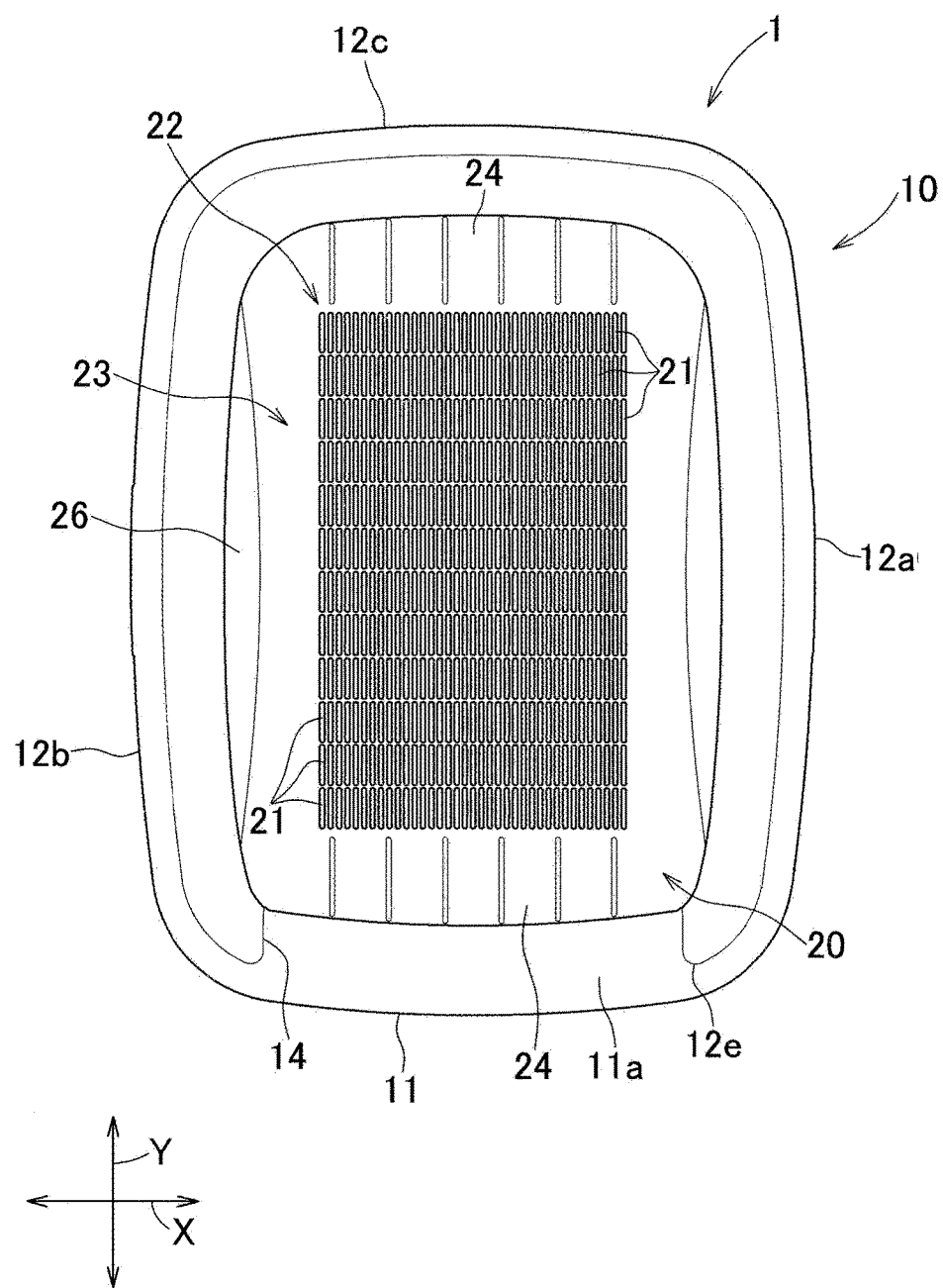
FIG. 4 is a plan view of the litter box.

Referring to FIG. 2 through FIG. 4, the liquid passable litter tray 20 is a plate-like member includes a liquid passable region 22 which is rectangular as seen in its planar view and defined by a plurality of through-holes 21 through which the receiving space 2 is kept in fluid-communication with the upper space, a non-liquid passable region 23 extending along a periphery of the liquid passable region 22 and a frame 27 provided along an upper end of the non-liquid-passing region 23. Each of the through-holes 21 has a length dimension in the transverse direction X shorter than a length dimension in the longitudinal direction Y and the length dimension in the transverse direction X is smaller than an average grain diameter of granular substance (not shown) scattered on upper surface of the liquid passable litter tray 20. It is possible for the through-holes 21 dimensioned in this way to prevent the granular substance (for example, so-called cat litter) deposited on the upper surface of the liquid passable litter tray 20 from falling into the receiving space 2. The animal liquid excrement discharged onto the liquid passable litter tray 20 falls into the receiving space through these through-holes 21.

The non-liquid passable region 23 has none of the above-mentioned through-holes 21. This non-liquid passable region 23 includes a first sloped region 24 contiguously extending from the liquid passable region 23 and defined at a low angle with respect to a horizontal plane 3, a second sloped region 25 contiguously extending from the frame 27 and defined at a steep angle with respect to the horizontal plane 3 and an intermediate region 26 adapted to connect the first and second sloped regions 24, 25 to each other.

The second sloped region 25 is formed on each of both sides in the transverse direction X of the liquid passable region 22 so as to define a curved surface including a parabola of which a tangent line tilt may gradually increase from a region proximal to the liquid passable region 22 toward a distal region.

Referring to FIG. 2, the intermediate region 26 is present on each of both sides in the transverse direction X of the liquid passable region 22 but not present in each of both sides in the longitudinal direction Y of the liquid passable region 22 as illustrated in FIG. 3.

On the liquid passable litter tray 20 and inside the wall 12 of the upper side cover 10, the liquid passable litter tray 20 and the upper side cover 10 define a litter space 4 for the granular substance (not shown) primarily formed from, for example, silica gel. Animals such as cats enter or leave this litter space 4 through the doorway 14.

The liquid passable litter tray 20 is formed from polyolefin-based thermoplastic synthetic resin such as polyethylene, polypropylene, polyethylene terephthalate so that the liquid passable region 22, the non-liquid passable region 23 and the frame 27 may be integrally molded.

Figure 5:
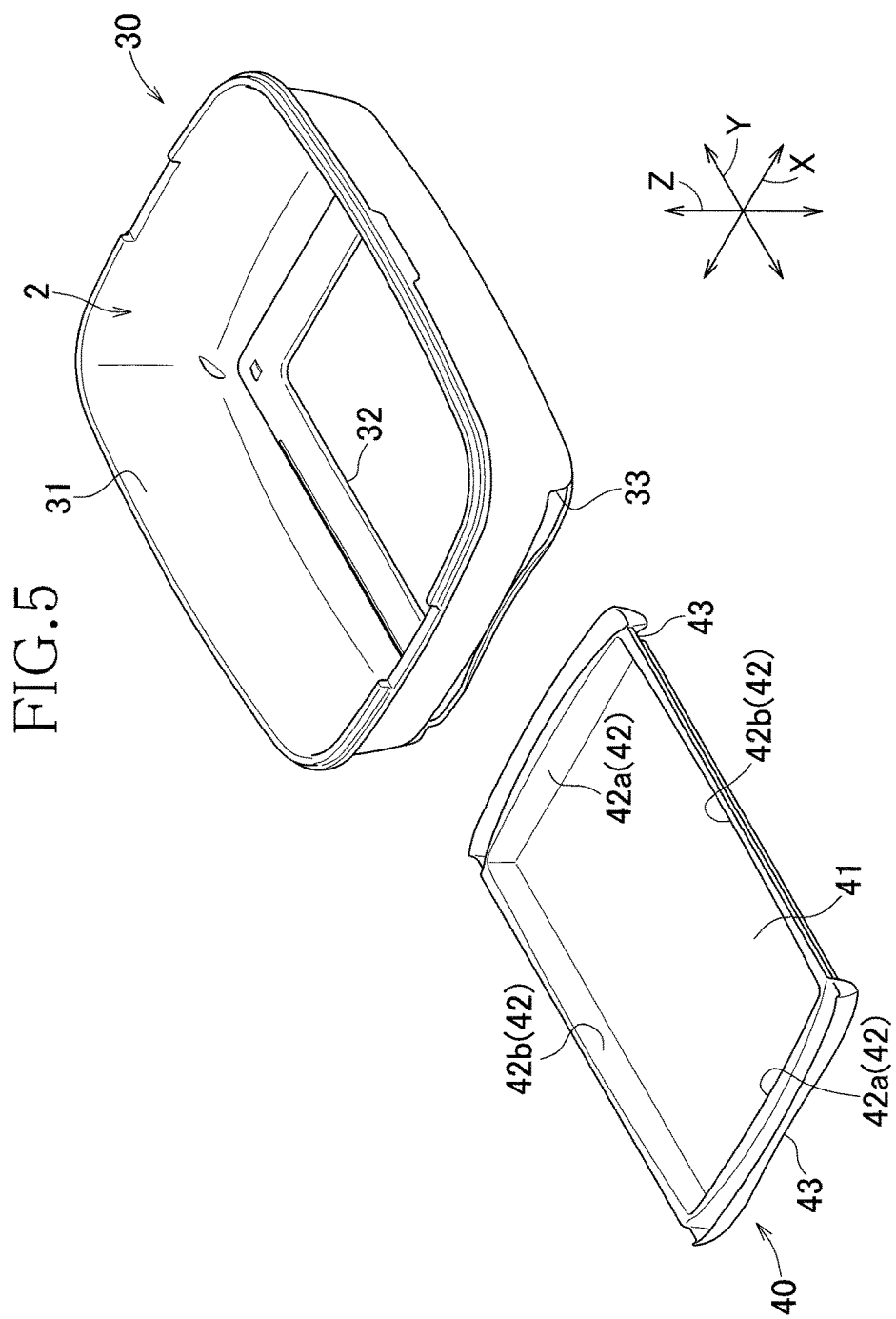
FIG. 5 is a perspective view of the lower container with the excrement tray having been moved out from the lower container.

Referring to FIG. 5, the lower container 30 has the top opening 31 at its top side, a bottom opening 32 at its bottom, and an end opening 33 on the front side as viewed in the longitudinal direction Y so that the excrement tray 40 may be moved into or outward from the receiving space 2 through this end opening 33. An area of the top opening 31 is larger than an area of the bottom opening 32. The lower container 30 is integrally molded with use of, for example, polyolefin-based thermoplastic synthetic resins such as polyethylene, polypropylene or polyethylene terephthalate.

Referring again to FIGS. 2 and 3, the lower container 30 includes a excrement tray 40 adapted to be manually movable in the longitudinal direction Y between the put-in position defined below the liquid passable litter tray within the receiving space 2 and a drawn out position defined outside the receiving space 2. As will be apparent from, for example, FIG. 10, the excrement tray 40 serves to support an absorbent structure 50 having a rectangular shape which is longer in the longitudinal direction Y than in the transverse direction X as seen in its planar view.

Referring again to FIG. 5, the excrement tray 40 has a bottom wall 41 which is rectangular as seen in its planar view, a side wall 42 rising from a peripheral edge of the bottom wall 41 defined four sides thereof and user's finger insertion grooves 43 provided along both ends in the longitudinal direction Y. The excrement tray 40 is formed from, for example, polyolefin-based thermoplastic synthetic resins such as polyethylene, polypropylene or polyethylene terephthalate so that the bottom wall 41, the side wall 42 and the user's finger insertion grooves 43 may be integrally molded.

As will be apparent from FIGS. 2 and 3, an area S1 of the bottom wall 41 is larger than an area of the bottom opening 32 of the lower container 30 and the bottom opening 32 is closed by the bottom wall 41 when the excrement tray 40 is put in the receiving space 2. The lower container 30, the excrement tray 40 and the liquid passable litter tray 20 define the receiving space 2. The area S1 of the bottom wall 41 is larger than an area S3 of the liquid passable region 22 and the liquid passable region 22 is included within a region immediately above the bottom wall 41 when the excrement tray 40 is placed at its put-in position.

The side wall 42 is composed of a pair of longitudinally opposite side walls 42a, 42a opposed to each other in the longitudinal direction Y referring to FIG. 3 and a pair of transversely opposite side walls 42b, 42b opposed to each other in the transverse direction X referring to FIG. 2.

The pair of the side walls opposite to each other is arranged in such a tilted manner that the pair of the side walls may be further distanced from each other as these walls extend upward.

A total area S2 of the bottom wall 41 and the side walls 42 measured in a planar view is larger than the area S3 of the liquid passable region 22 and, in consequence, the liquid passable region 22 is included within a region immediately above the bottom wall 41 and the side wall 42 when the excrement tray 40 is placed at its put-in position.

Figure 6:
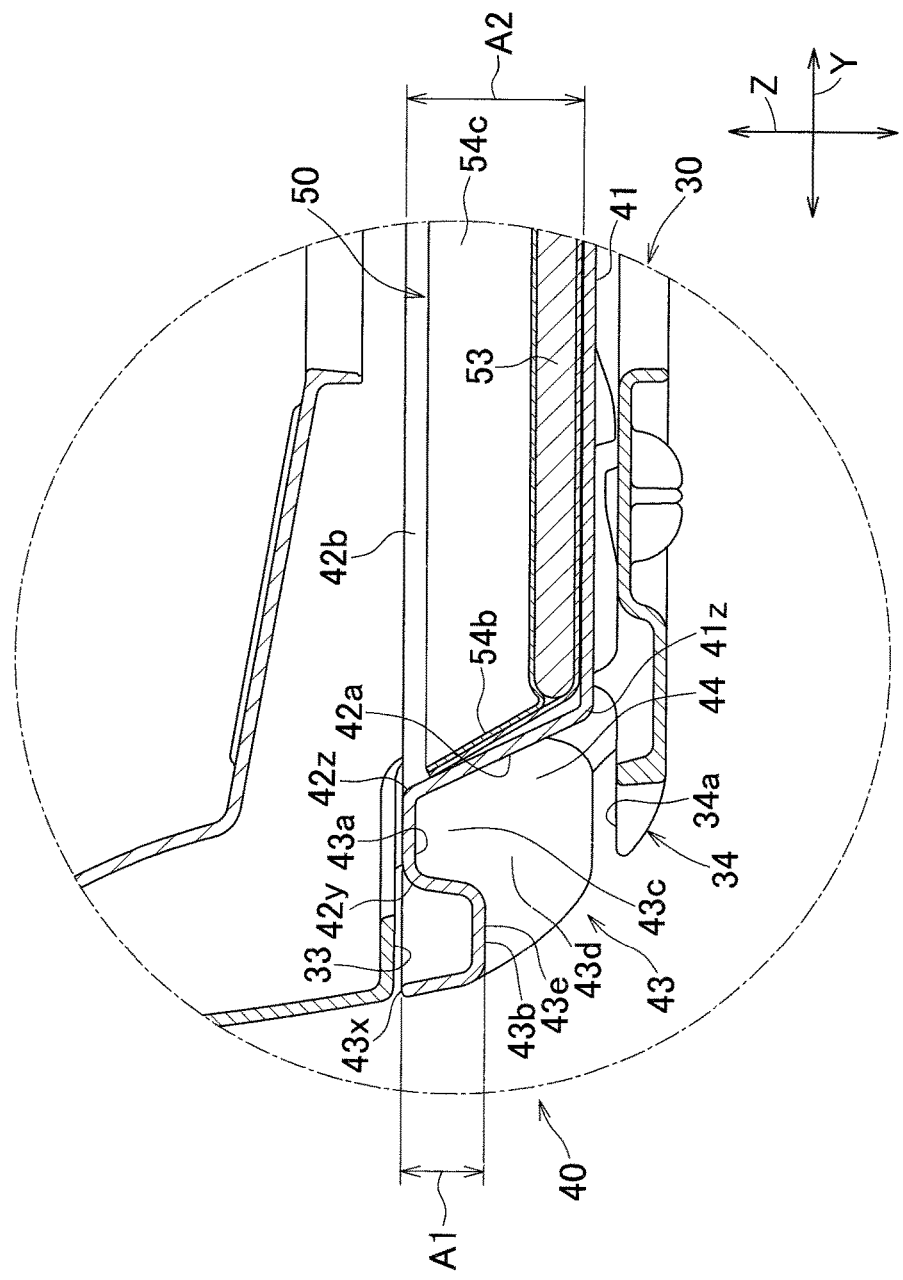
FIG. 6 is a scale-enlarged sectional view of an encircled region VI in FIG. 3.

Each of the user's finger insertion grooves 43 makes it possible for a user to move the excrement tray 40 between the put-in position and the drawn out position by inserting his or her finger thereinto and provided, as will be understood from FIG. 6, so as to lie adjacent in the longitudinal direction to each of the 42a.

The user's finger insertion groove 43 includes a horizontal portion 43a horizontally extending from an upper end 42z of each of the longitudinally opposite side walls 42a and a protrusion portion 43b extending downward from an end 42y of the horizontal portion 43a so as to face the associated side wall 42.

Figure 7:
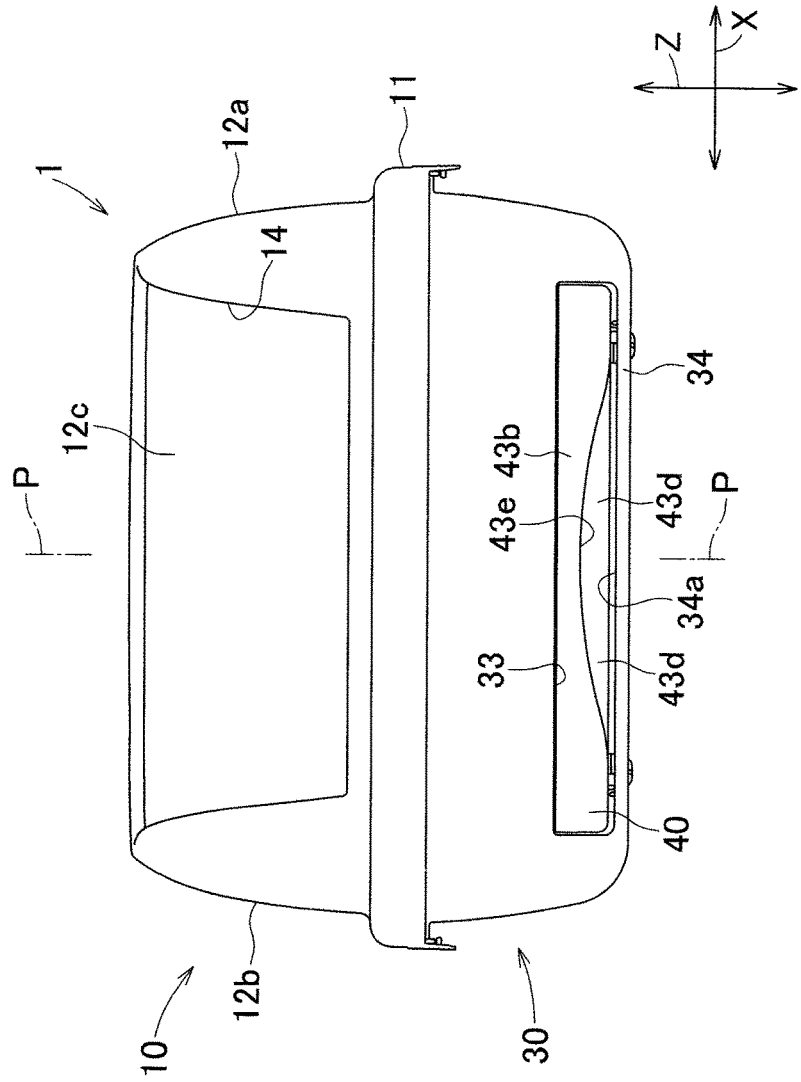
FIG. 7 is a front view of the litter box.

A length dimension A1 of the protrusion portion 43b measured in the vertical direction Z is smaller than a length dimension A2 of the longitudinally opposite side walls 42a measured in the vertical direction Z and a clearance 43d is defined in the vertical direction Z between the protrusion portion 43b and a bottom wall 34 of the lower container 30. The clearance 43d extends in the longitudinal direction Y along the protrusion portion 43b and the bottom wall 34. Each of the user's finger insertion grooves 43 is formed with concave portion 43c defined between the protrusion portion 43b and the associated one of the longitudinally opposite side walls 42a in the longitudinal direction Y and below the associated horizontal portion 43a. In consequence, the clearance 43d extends in the longitudinal direction Y and then extends upward from a rear end. When the user handles the excrement tray 40 utilizing the user's finger insertion groove 43, the user's fingers may be inserted into the clearance 43d between the excrement tray 40 and the lower container 30, then the fingertip may be inserted into the concave portion 43c and put on the protrusion portion 43b. In this way, the excrement tray 40 may be easily handled. Furthermore, referring to FIG. 7, the protrusion portion 43b is formed so that the clearance 43d defined between an upper end 34a of the bottom wall 34 of the lower container 30 and a lower end 43e of the protrusion portion 43b of the excrement tray 40 may have a largest width dimension on the imaginary longitudinal center line P and the clearance 43d defined between an upper end 34a of the bottom wall 34 of the lower container 30 and a lower end 43e of the protrusion portion 43b may gradually narrow with distance from the imaginary longitudinal center line P. The protrusion portion 43b of the user's finger insertion groove 43 formed in this manner facilitates the user's fingers to be inserted into the user's finger insertion groove 43 at a central region in the transverse direction X of the excrement tray 40. Consequently, such protrusion portion 43b gives the user's finger insertion groove 43 a positioning function to guide the user's fingers to a position at which the user's handling may be most easily carried out.

Figure 8:
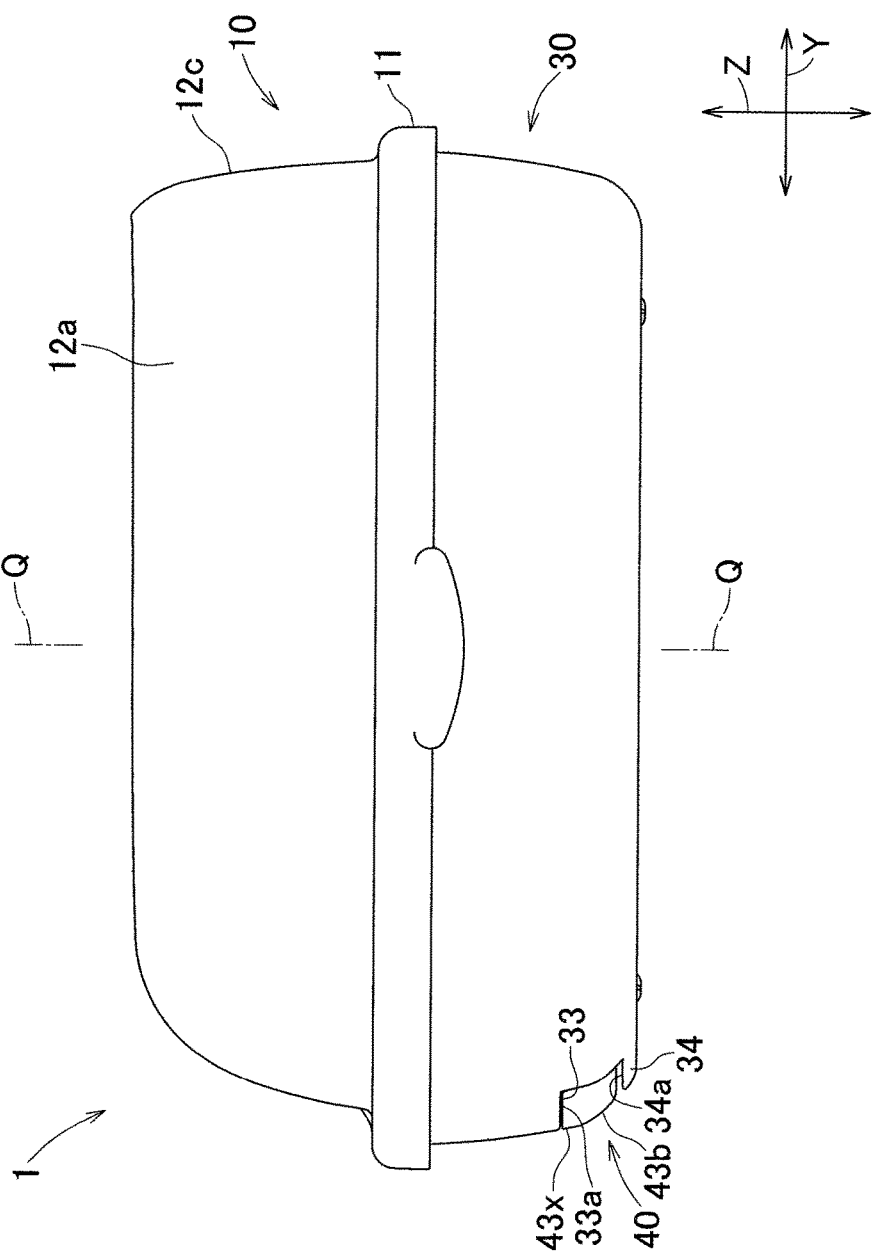
FIG. 8 is a side view of the litter box.

An outer peripheral surface of the protrusion portion 43b of the excrement tray 40 is formed, referring to FIG. 8, so that the outer peripheral surface of the protrusion portion 43b may extend along the outer peripheral surface of the lower container 30. Specifically, an outer periphery of the protrusion portion 43b of the excrement tray 40 is configured to define a curved surface including a parabola in which an upper end 43x thereof is most distanced in the vertical direction Z from the imaginary transverse center line Q, this distance is gradually reduced as the outer periphery extends downward, an upper end 33a of the peripheral wall defining the end opening 33 is contiguous to an upper end 34a of the bottom wall 34 and a tilt of tangent line is gradually reduced from an upper end 43x toward the imaginary transverse center line Q.

Figure 9:
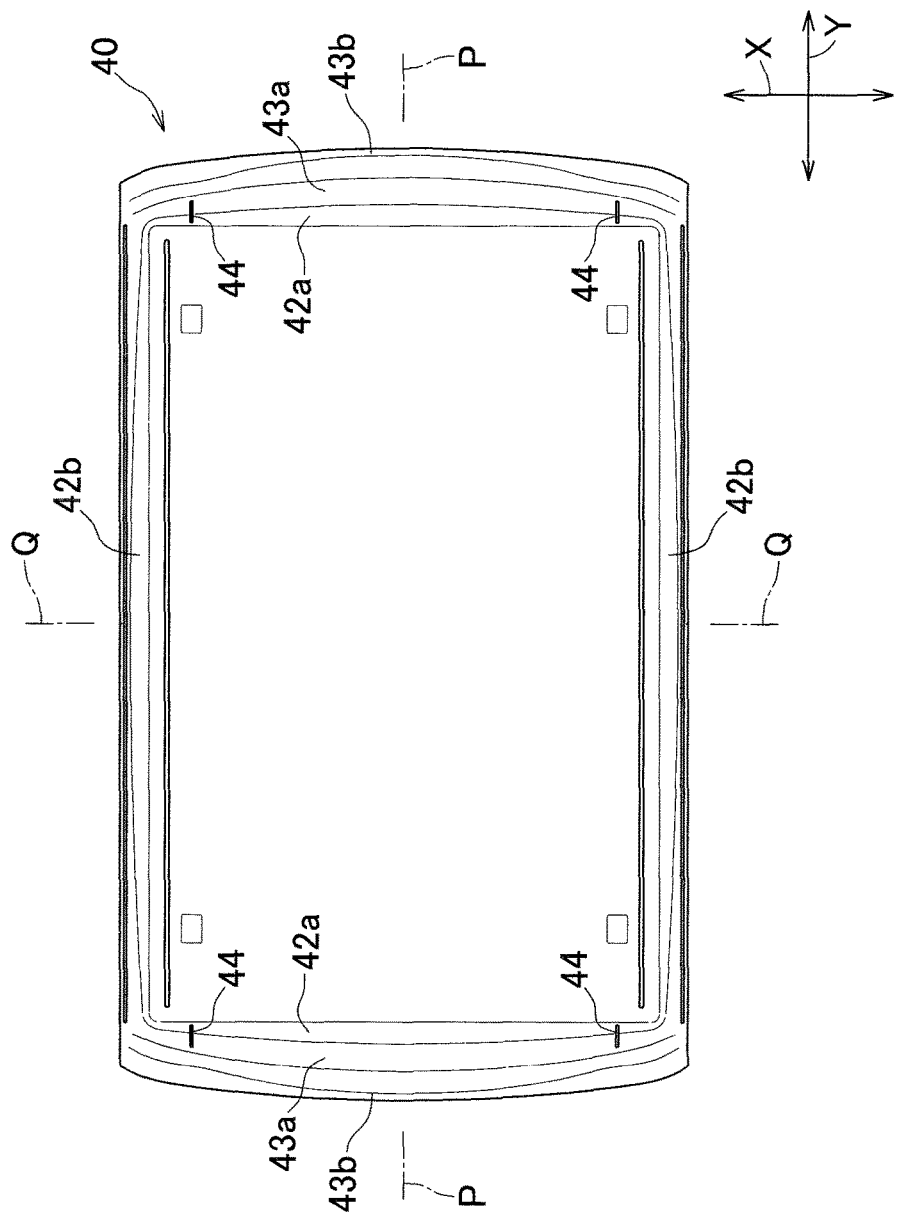
FIG. 9 is a bottom plan view of the excrement tray.

The excrement tray 40 is provided, referring to FIG. 6, between the respective protrusion portions 43b and the associated longitudinally opposite side walls 42a with platelike ribs 44 referring to FIG. 6 for the purpose of interlinking the protrusion portions 43b to the associated longitudinally opposite side walls 42a. Referring to FIG. 9, these ribs 44 are provided adjacent to the ends in the transverse direction X of the excrement tray 40. More specifically, the ribs 44 are provided at four corners of the excrement tray 40 so as to be symmetric about the imaginary longitudinal center line P as well as about the imaginary transverse center line Q. These ribs function to enhance a stiffness of the horizontal portions 43a. While the illustrated excrement tray 40 is provided at the opposite ends in the longitudinal direction Y with the user's finger insertion grooves 43 symmetrically about the imaginary transverse center line Q, it is possible to provide the user's finger insertion groove 43 at either end in the longitudinal direction Y.

Figure 10:
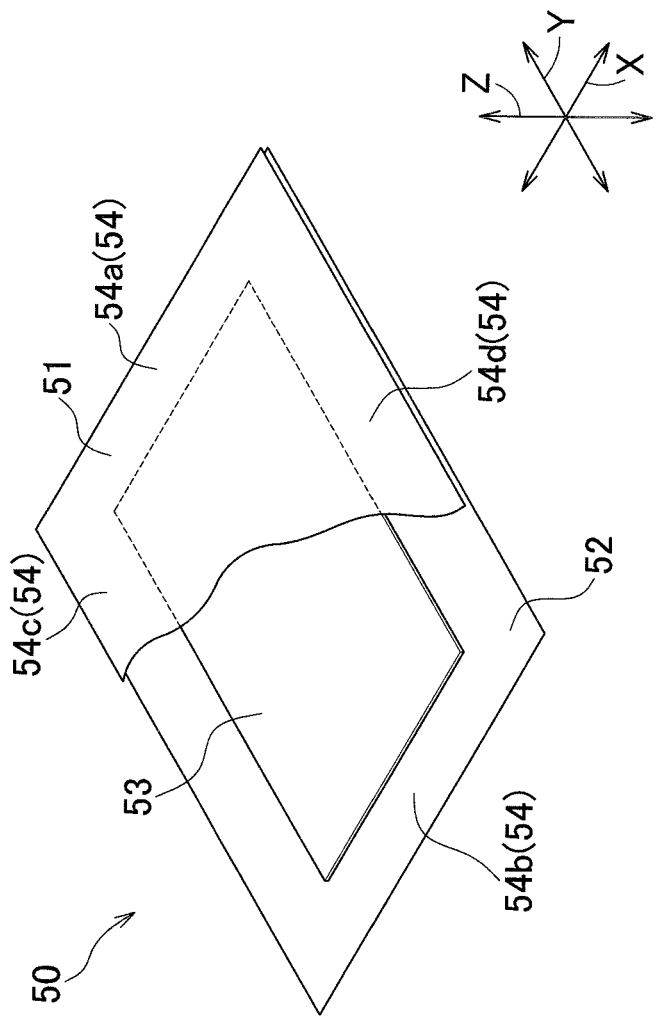
FIG. 10 is a perspective view of the absorbent structure.

Referring to FIG. 10, the absorbent structure 50 is composed of a liquid-permeable topsheet 51, a liquid-impermeable backsheet 52 and an absorbent core 53 interposed between these sheets 51, 52 so that the absorbent structure 50 as a whole may have a rectangular shape as seen in its planar view. The absorbent core 53 is composed of wood fluff pulp and superabsorbent polymer particles and formed in a rectangular shape as seen in its planar view. Along a periphery of the absorbent structure 50, a flap 54 composed of the topsheet 51 and the backsheet 52 is formed. In the flap 54, the absorbent core 53 is not present. The flap 54 is composed of a front flap 54a and a rear flap 54b provided at both ends in the longitudinal direction Y and a left flap 54c and a right flap 54d provided at both ends in the transverse direction X. The absorbent core 53 functions to absorb and contain the animal liquid excrement fell into the receiving space 2 through the through-holes 21.

With the absorbent structure 50 set in the excrement tray 40, referring to FIG. 6, the absorbent core 53 is placed on the bottom wall 41, the front and rear flaps 54a, 54b are put in contact with the longitudinally opposite side walls 42a and the left and right flaps 54c, 54d are put in contact with the transversely opposite side walls 42b.

In the embodiments of the illustrated litter box 1, the pair of the side walls 42a, 42b is tilted so as to be gradually distanced from each other as these side walls extend upward and, in consequence, an apparent length dimension A2 in the vertical direction Z of the side wall 42 can be shortened even when a desired length of the side walls 42a, 42b and a desired length of the flaps 54a-54d are maintained. In this way, it is possible to provide the litter box 1 adapted to shorten the fall length of animal liquid excrement. In addition, the pair of the side walls 42a, 42b are arranged so that these side walls are gradually distanced from each other as these walls extend upward.

Consequently, it is possible to enlarge an area of the opening defined by an upper end 42z of these pairs of the side walls 42a, 42b, thereby preventing animal liquid excrement from leaking out of the excrement tray 40.

In the embodiments of the illustrated litter box 1, the total area S2 measured in a planar view of the bottom wall 41 and the side wall 42 is larger than the area S3 measured in a planar view of the liquid passable region 22 and, when the excrement tray 40 is at the put-in position, the liquid passable region 22 is included within the region immediately above the bottom wall 41 and the side wall 42. In consequence, it is possible to prevent animal liquid excrement falling through the through-holes 21 of the liquid passable litter tray 14 from leaking out of the tray 40. In addition, the area S1 of the bottom wall 41 of the excrement tray 40 is larger than the area S3 of the liquid passable region 22 and, when the excrement tray 40 is at the put-in position, the liquid passable region 22 is included within the region immediately above the bottom wall 41. Consequently, it is assured to prevent animal liquid excrement from leaking out of the excrement tray 40.

While cats are taken as an example pet animals in the embodiment described above, animals suitable for use of the litter box according to the present invention is not limited to cats but include other mammals such as dogs, rabbits or hamsters as well as baby mammals such as baby tigers or lions. Furthermore, it is also possible to use the litter box according to the present invention for reptiles such as snakes and birds such as chickens.

In the excrement tray 40 according to the embodiment described above, the pair of the side walls 42 opposed to each other is arranged with a tilt so that these side walls are gradually distanced from each other as these side walls extend upward. According to the present invention, referring to FIG. 11(a) in which an angle relative to the horizontal plane is designated as θ, the linear side wall 42 passing through an end 41z of the bottom wall 41 and the upper end 42z of the side wall 42 may lie between a first imaginary straight line L1 defined by θ=80° (θ in this case is designated by θ1 in FIG. 11) and a second imaginary straight line L2 defined by θ=20° (θ in this case is designated by θ2 in FIG. 11). In other words, the pair of the side walls opposed to each other may be arranged so that the linear side wall 42 passing through the end 41z of the bottom wall 41 and the upper end 42z of the side wall 42 extends within an imaginary region 49 defined by the first imaginary straight line L1 and the second imaginary straight line L2.

When θ is smaller than 20°, the apparent length dimension A2 in the vertical direction Z of the side wall 42 indicated in FIG. 6 will be too small to receive a large quantity of animal liquid excrement in the excrement tray 40 and there is an anxiety that the liquid excrement might spill out from the excrement tray 40. When θ is larger than 80°, in contrast, a substantive function to reduce the apparent length dimension A2 in the vertical direction Z of the side wall 42 cannot be fulfilled. From this viewpoint, the side wall 90a1 arranged at the angle θ relative to the horizontal plane 84 in a range of about 88.5° to about 89.0° disclosed in the Patent Literature 1 is not included in the concept according to the present invention "the pair of the side walls 42 is arranged with appropriate tilt angles so as to be gradually distanced from each other as these side wall 42 extend upward".

A length dimension Ld of the side wall 42 measured along its tilted surface is in a range of about 15 mm to about 50 mm in consideration of a length of the flap 54 of the absorbent structure 50.

The apparent length dimension A2 in the vertical direction Z of the side wall 42 is in a range of about 5.1 mm to about 49.3 mm. The apparent length dimension A2 in the vertical direction Z of the side wall 42 can be determined as a product of the length dimension Ld of the side wall 42 measured along the tilted surface thereof. A2 is minimum when Ld is about 15 mm and θ is 20°. Conversely, A2 is maximum when Ld is about 50 mm and θ is 80°.

While the side wall 42 defined by a single straight line as seen in its sectional view has been described according to the present embodiment, the side wall 42 in the litter box 1 according to the present invention is not limited to such side wall 42 defined by a single straight line and it is also possible to form the side wall 42 so as to be defined by two or more straight lines as seen in its sectional view.

For example, referring FIG. 11(b), it is also possible to form the side wall 42 so as to be defined first by one straight line having a steep slope and then by another straight line having a shallow slope. Though not illustrated, it is also possible to form the side wall 42 so as to be defined first by one straight line having a shallow slope and then by another straight line having a steep slope. Of course, the number of the straight lines is not limited to one or two but may be three or more. Regardless of the number of the straight lines, the side wall 42 is formed in such a manner that these straight lines extend within the imaginary region 49.

While the side wall 42 defined by two or more straight lines as seen in sectional view has been described as one embodiment, it is possible to form the side wall 42 in the litter box 1 according to the present invention is not limited to the side wall 42 defined by the straight lines as seen in its sectional view but it is also possible to form the side wall 42 so as to be defined by curved lines as seen in its sectional view. In this regard, also when the side wall 42 is formed so as to be defined by the curved lines as seen in its sectional view, the side wall 42 is formed in such a manner that these curved lines extend within the imaginary region 49.

Figure 11:
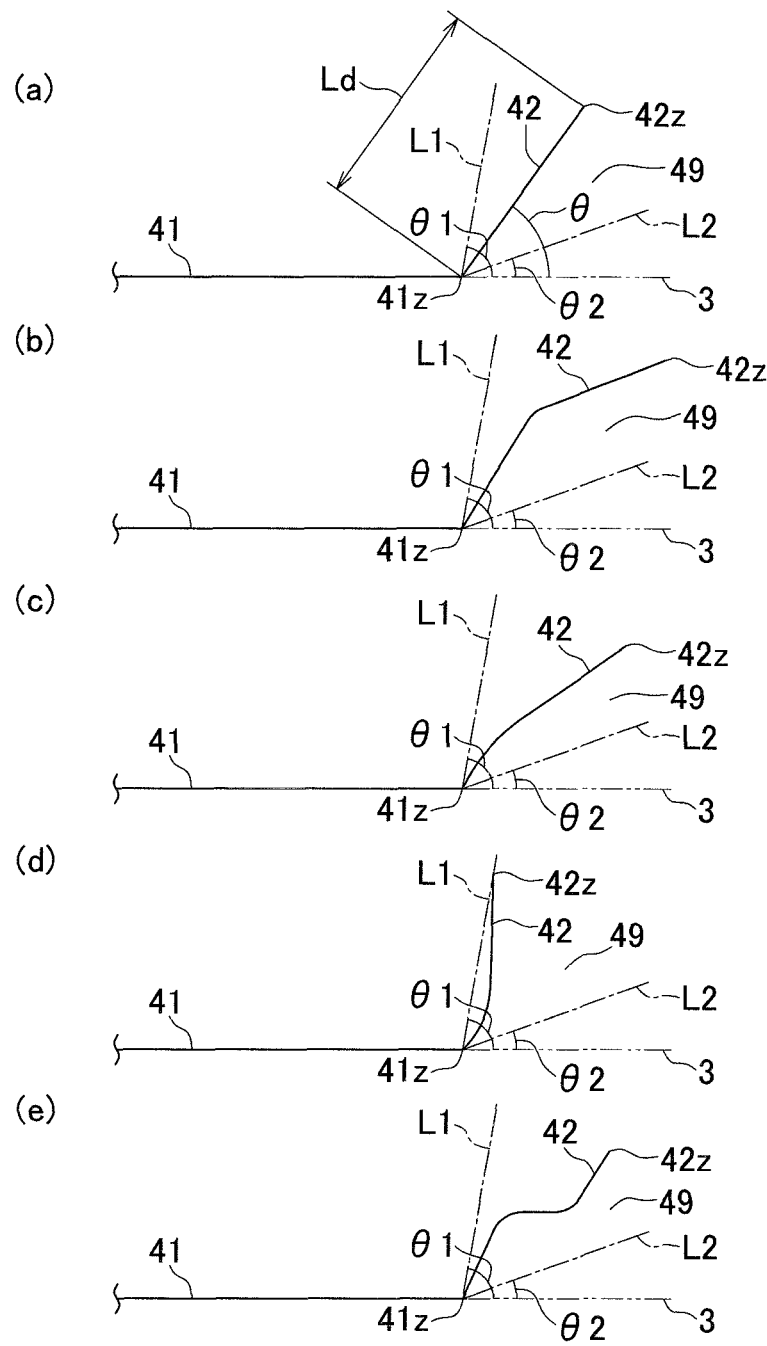
FIG. 11(*a*)-(*e*) are diagrams illustrating a tilt of the excrement tray's side wall.

For example, referring to FIG. 11 (c), it is possible to form the side wall 42 defined by a curved line which is convex upward as seen in its sectional view. Referring to FIG. 11 (d), it is also possible to form the side wall 42 defined by a curved line which is convex downward as seen in its sectional view. Furthermore, referring to FIG. 11 (e), it is possible to form the side wall 42 defined first by a shallow curved line which is convex upward and then by a shallow curved line which is convex downward as seen in its sectional view. Though not illustrated, it is also possible to form the side wall 42 so as to be defined first by a shallow curved line which is convex downward and then by a shallow curved line which is convex upward as seen in its sectional view. The number of the curved lines is not limited to one or two but may be three or more. Regardless of the number of the curved lines and the shapes of the individual curved lines, these curved lines extend within the imaginary region 49.

Now a litter box 100 according to a variant of the embodiment described above will be described hereunder. To avoid overlapped description of the above-described litter box 1, the component parts similar to those in the litter box 1 are designated by the same reference numerals as those used for the litter box 1.

Figure 12:
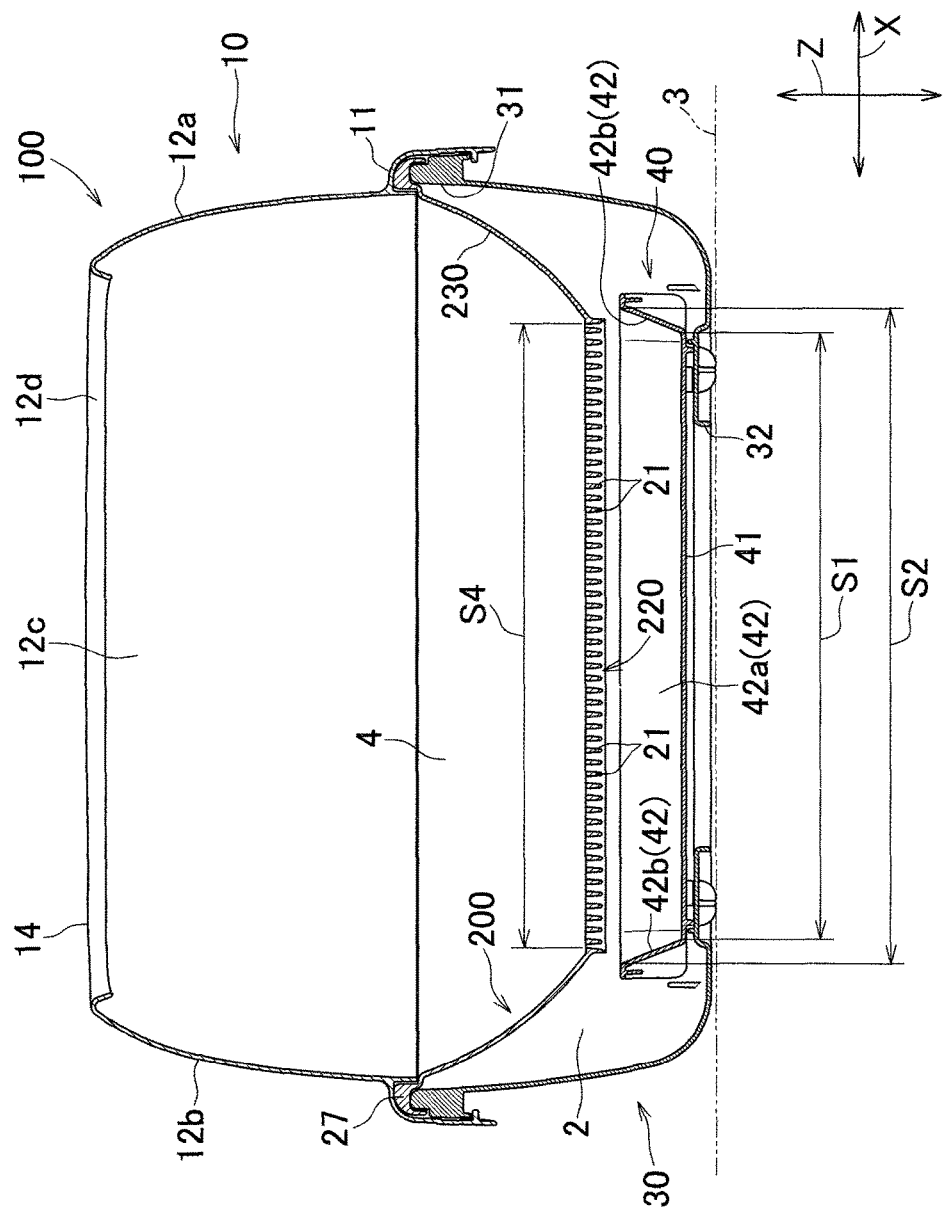
FIG. 12 is a sectional view of the litter box according to a variant embodiment of the present invention taken along the imaginary transverse center line.
Figure 13:
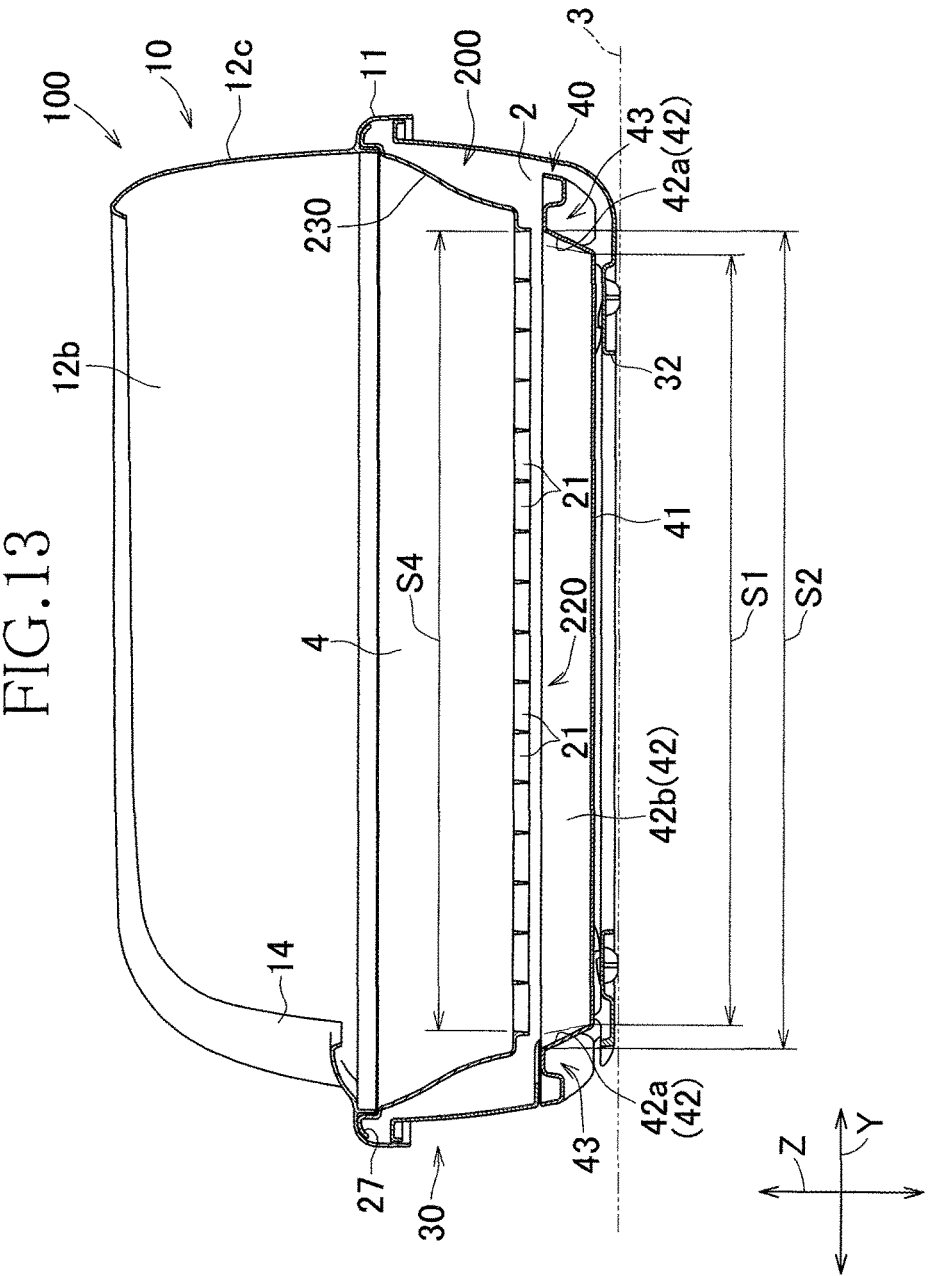
FIG. 13 is a sectional view of the litter box according to another variant embodiment of the present invention taken along the imaginary longitudinal center line.
Figure 14:
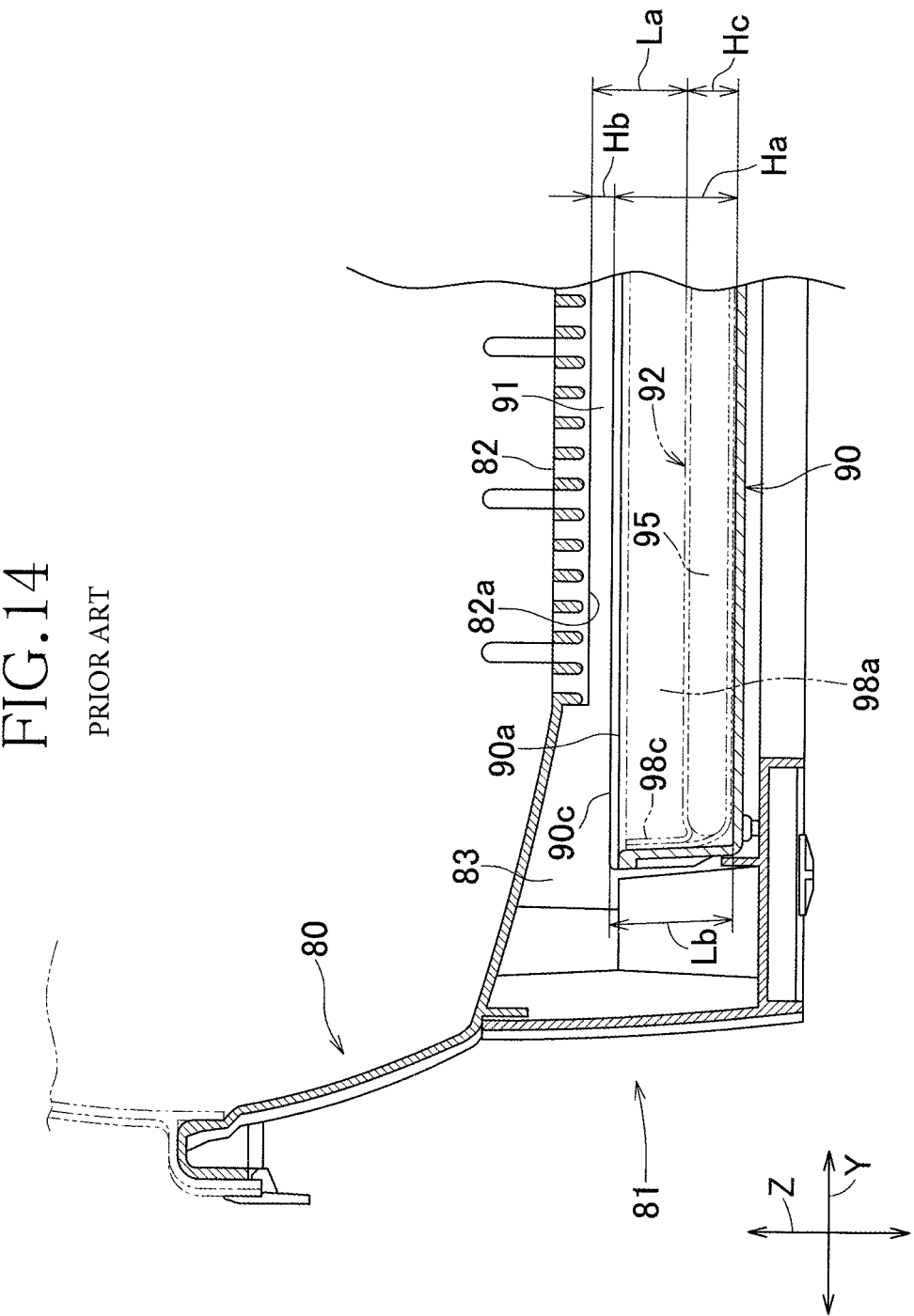
FIG. 14 is a sectional view of a substantial part in the known litter box.
Figure 16:
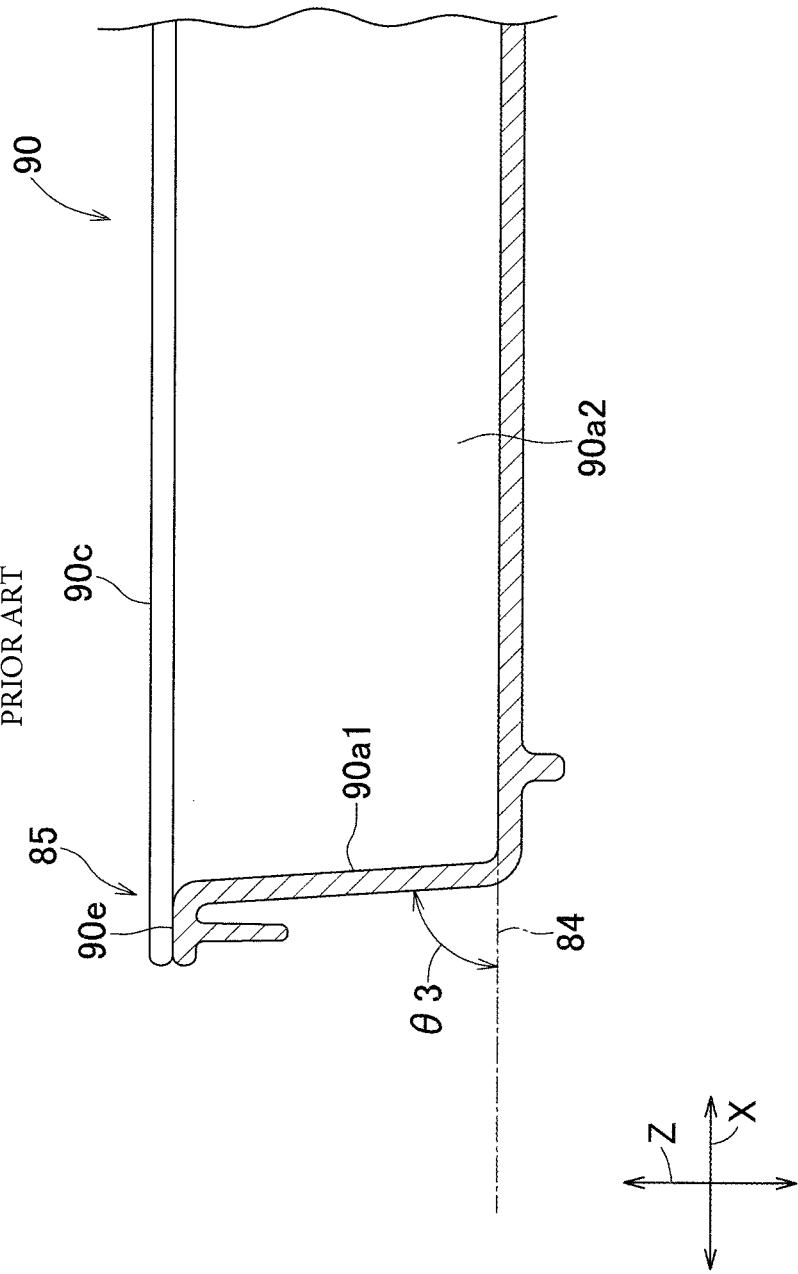
FIG. 16 is a sectional view of a substantial part in the known litter box.

As will be apparent from FIGS. 12 and 13, the litter box 100 is distinguished from the litter box 1 in the aspect that the litter box 100 includes a liquid passable litter tray 200 having an area S4 larger than the area S2 of the liquid passable region 22 of the liquid passable litter tray 20.

The liquid passable litter tray 200 has a plurality of through-holes 21, a liquid passable region 220 which is rectangular as seen its planar view, a non-liquid passable region 230 extending along a periphery of the liquid passable region 220 and the frame 27 provided on an upper end of the non-liquid passable region 230. The non-liquid passable region 230 is formed with none of the through-holes 21.

The liquid passable litter tray 200 is formed of polyolefin series thermoplastic synthetic resin such as polyethylene, polypropylene or polyethylene terephthalate so that the liquid passable region 220, the non-liquid passable region 230 and the frame 27 may be integrally molded.

In the litter box 100, the total area S2 of the bottom wall 41 and the side wall 42 is larger than an area S4 of the liquid passable region 220 as seen in the planar view and, with the excrement tray 40 set in the put-in position, the liquid passable region 220 is included within a region immediately above the bottom wall 41 and the side wall 42. The area S4 of the liquid passable region 220 is larger than the area S1 of the bottom wall 41 of the excrement tray 40 and, with the excrement tray 40 set in the put-in position, the bottom wall 41 is included below the liquid passable region 220.

In this litter box 100, the total area S2 of the bottom wall 41 and the side wall 42 is larger than the area S4 of the liquid passable region 220 as seen in the planar view and, with the excrement tray 40 set in the put-in position, the liquid passable region 220 is included within the region immediately above the bottom wall 41 and the side wall 42. Inconsequence, it is possible to prevent the liquid excrement falling through the through-holes 21 of the liquid passable litter tray 200 from leaking out of the excrement tray 40.

The area of the liquid passable region 220 is larger than the area of the bottom wall 41 of the excrement tray 40 and, in consequence, it is possible to reduce the area of the non-liquid passable region 230 in the liquid passable litter tray 200. In some cases, the liquid excrement adheres to the non-liquid passable region 230 but the arrangement as has been described just above makes it possible to reduce the area which might be soiled with the liquid excrement adhering thereto, thereby obscuring the stain.

According to the embodiments described heretofore, the upper side cover 10, the lower container 30 and the liquid passable litter tray 20, 200 are individually provided and assembled to form the litter box 1, 100. However, the present invention is not limited to such configuration but it is possible to form the upper side cover 10 and the liquid passable litter tray 20, 200 integrally or to form the lower container 30 and the liquid passable litter tray 20, 200 integrally.

It is not essential to provide the lower container 30 with the bottom opening 32 and the lower container 30 may be formed so as to close the bottom opening 32. By forming the lower container 30 in this manner, it is possible to prevent the liquid excrement from falling onto the floor on which the litter box 1, 100 is placed. In this case, the receiving space 2 is defined by the lower container and the liquid passable litter tray 20.

REFERENCE SIGNS LIST 1 animal litter box
2 receiving space
10 upper side cover
14 doorway
20 liquid passable litter tray
21 through-holes
22 liquid passable region
23 non-liquid passable region
30 lower container
31 top opening (opening)
33 end opening
40 excrement tray
41 bottom wall
41z ends
42a longitudinally opposite side walls (side walls)
42b transversely opposite side walls (side walls)
42z upper end
43 user's finger insertion groove
49 imaginary region
50 absorbent structure
51 topsheet
52 backsheet
53 absorbent core
54 (54a) front flap (flap)
54 (54b) rear flap (flap)
54 (54c) right flap (flap)
54 (54d) left flap (flap)
100 animal litter box
200 liquid passable litter tray
220 liquid passable region
230 non-liquid passable region
A2 apparent length dimension of side wall measured in vertical direction
L1 first imaginary straight line
L2 second imaginary straight line
Ld length along tilted surface of side wall
X transverse direction
Y longitudinal direction
Z vertical direction
θ angle defined between imaginary line, passing through end of bottom wall and upper end of side wall, and horizontal plane

The invention claimed is:

1. An animal litter box having a transverse direction, a longitudinal direction, a vertical direction, and an imaginary longitudinal centerline bisecting a dimension of the litter box in the transverse direction, said litter box comprising:
a lower container having an upper opening,
an upper side cover placed on the lower container, and
a liquid passable litter tray interposed between the upper side cover and the lower container and cooperating with the lower container to close the upper opening to define a receiving space in such a manner that liquid is flowable through the liquid passable litter tray into the receiving space,
wherein
the lower container has
an excrement tray manually movable in the longitudinal direction between a put-in position at which the excrement tray is set within the receiving space below the liquid passable litter tray and a drawn out position outside the receiving space,
a bottom wall configured to be located below the excrement tray when the excrement tray is at the put-in position, and
an end opening through which the excrement tray is put into or drawn out from the receiving space,
the excrement tray has
a bottom wall, and
a plurality of side walls formed along a peripheral edge of the bottom wall and adapted to be put in contact with a flap of an absorbent structure, the flap extending along a peripheral edge of the absorbent structure when the absorbent structure is disposed in the excrement tray, and the plurality of side walls including first and second side walls formed in a tilted manner and gradually distanced away from each other as the first and second side walls extend upward,
the liquid passable litter tray has
a liquid passable region including a plurality of through-holes, and
a non-liquid passable region extending along a peripheral edge of the liquid passable region and not including the plurality of through-holes,
the excrement tray includes a groove adjacent to the first side wall, the groove configured to receive a user's finger inserted therein for manual movement of the excrement tray between the put-in position and the drawn out position,
the groove includes
a horizontal portion horizontally extending in the longitudinal direction directly from a top end of the first side wall,
a protrusion portion protruding downward from an end of the horizontal portion and facing the first side wall, wherein a dimension of the protrusion portion in the vertical direction is smaller than a dimension of the first side wall in the vertical direction, and
a concave portion between the first side wall and the protrusion portion in the longitudinal direction, the concave portion located below the non-liquid passable region of the liquid passable litter tray,
the protrusion portion of the groove of the excrement tray and the bottom wall of the lower container are spaced apart in the vertical direction to define a clearance,
the protrusion portion has an opening facing upward in the vertical direction,
the protrusion portion has an outer wall defining an outer peripheral surface of the excrement tray,
the outer peripheral surface of the excrement tray extends along and is flush with an outer peripheral surface of the lower container in the vertical direction,
a distance between an upper end of the bottom wall of the lower container and a lower end of the protrusion portion in the clearance has a maximum value on the imaginary longitudinal center line, and
the distance gradually decreases from the imaginary longitudinal center line towards the first and second side walls in the transverse direction.

2. The animal litter box according to claim 1, wherein the first side wall extends within an imaginary region defined by a first imaginary straight line extending at an angle of 80° relative to a horizontal plane and a second imaginary straight line extending at an angle of 20° relative to the horizontal plane.

3. The animal litter box according to claim 1, wherein
a total area of (i) the bottom wall of the excrement tray and (ii) the plurality of side walls is larger than an area of the liquid passable region, and
when the excrement tray is set at the put-in position, the liquid passable region is immediately above the bottom wall of the excrement tray and the plurality of side walls.

4. The animal litter box according to claim 3, wherein
the area of the liquid passable region is larger than the area of the bottom wall of the excrement tray, and
when the excrement tray is set at the put-in position, the bottom wall is below the liquid passable region.

5. The animal litter box according to claim 1, wherein
an area of the bottom wall of the excrement tray is larger than an area of the liquid passable region, and
when the excrement tray is set at the put-in position, the liquid passable region is above the bottom wall of the excrement tray.

6. The animal litter box according to claim 1, wherein a length dimension of each of the first and second side walls along a tilted surface thereof is in a range of 15 mm to 50 mm.

7. The animal litter box according to claim 1, wherein a length dimension of each of the first and second side walls in the vertical direction is in a range of 5.1 mm to 49.3 mm.

8. The animal litter box according to claim 1, wherein
the bottom wall of the excrement tray is rectangular as seen in a planar view of the excrement tray, and
the liquid passable region of the liquid passable litter tray is rectangular as seen in a planar view of the liquid passable litter tray.

9. The animal litter box according to claim 1, wherein the non-liquid passable region outside the liquid passable region is free of through holes.

10. The animal litter box according to claim 9, wherein
a dimension of the liquid passable region in the transverse direction is greater than a dimension of the bottom wall of the excrement tray in the transverse direction, and is less than a distance between said first and second side walls in the transverse direction.

11. The animal litter box according to claim 1, wherein the plurality of side walls further includes third and fourth side walls formed in a tilted manner and gradually distanced away from each other as said third and fourth side walls extend upward.

12. The animal litter box according to claim 1, wherein the non-liquid passable region of the liquid passable litter tray includes
a first sloped region contiguously extending from the liquid passable region at a first angle with respect to the horizontal direction,
a second sloped region contiguously extending from a peripheral edge of the liquid passable litter tray at a second angle with respect to the horizontal direction, and an intermediate region connecting the first and second sloped regions to each other and extending at a third angle with respect to the horizontal direction, and the first angle, the second angle, and the third angle are different from each other.

13. The animal litter box according to claim 12, wherein the first angle is smaller than the second angle.

14. The animal litter box according to claim 12, wherein the liquid passable litter tray has two transverse sides opposing each other in the transverse direction, and two longitudinal sides opposing each other in the longitudinal direction, and the intermediate region is provided at the two transverse sides of the liquid passable litter tray and is absent at the two longitudinal sides of the liquid passable litter tray.

15. The animal litter box according to claim 12, wherein the first and second sloped regions and the intermediate region are within the receiving space of the lower container, and the second sloped region is surrounded by a peripheral wall of the lower container.

16. The animal litter box according to claim 1, wherein the horizontal portion of the groove defines a flat or planar section horizontally extending in the longitudinal direction from the top end of the first side wall.

* * * * *